(12) United States Patent
Burt et al.

(10) Patent No.: US 10,295,080 B2
(45) Date of Patent: May 21, 2019

(54) FAST ATTACHMENT OPEN END DIRECT MOUNT DAMPER AND VALVE ACTUATOR

(71) Applicant: SCHNEIDER ELECTRIC BUILDINGS, LLC, Rockford, IL (US)

(72) Inventors: Alan Burt, Rockford, IL (US); Nicholas James DeJong, Machesney Park, IL (US)

(73) Assignee: Schneider Electric Buildings, LLC, North Andover, MA (US)

( * ) Notice: Subject to any disclaimer, the term of this patent is extended or adjusted under 35 U.S.C. 154(b) by 1271 days.

(21) Appl. No.: 13/710,709

(22) Filed: Dec. 11, 2012

(65) Prior Publication Data

US 2014/0158919 A1    Jun. 12, 2014

(51) Int. Cl.
*F16K 1/20*    (2006.01)
*F16K 1/22*    (2006.01)
(Continued)

(52) U.S. Cl.
CPC .......... *F16K 31/535* (2013.01); *F16K 1/2007* (2013.01); *F16K 1/2021* (2013.01);
(Continued)

(58) Field of Classification Search
None
See application file for complete search history.

(56) References Cited

U.S. PATENT DOCUMENTS 556,151 A *   3/1896   Johnson ................ B25B 13/463
                                                    81/58.2

1,414,354 A *   5/1922   Gibbs ....................... B25B 5/10
                                                    269/250
(Continued)

FOREIGN PATENT DOCUMENTS

CN         1044978 A     8/1990
CN       101003253 A     7/2007
(Continued)

OTHER PUBLICATIONS

Knowledge is Power—The Belimo Energy Valve™; brochure; known prior to Aug. 6, 2012; 4 pages; Belimo Americas, Danbury, CT.
(Continued)

*Primary Examiner* — Avinash A Savani
*Assistant Examiner* — Martha M Becton
(74) *Attorney, Agent, or Firm* — Locke Lord LLP

(57) ABSTRACT

An actuator assembly includes a housing, and a clamp disposed within the housing. The clamp is configured to attach the actuator assembly to a damper jackshaft or valve stem or valve linkage shaft. The jackshaft is operable to control the position of one or more damper blades. The valve stem and valve linkage shaft control the position of the valve plug. The clamp is accessible via a slotted opening which is unobstructed at one end. A motor is configured to rotate the clamping device within the housing. A control module is coupled to the motor and configured to control the damper or valve actuator assembly. In embodiments, a communications module facilitates communications to and from the damper actuator assembly over a network, and allows both remote monitoring of the damper and remote control of the damper actuator assembly or of the valve and remote control of the valve actuator assembly.

37 Claims, 9 Drawing Sheets

(51) Int. Cl.
*F16K 5/00* (2006.01)
*F16K 31/04* (2006.01)
*F16K 31/53* (2006.01)

(52) U.S. Cl.
CPC ............ *F16K 1/221* (2013.01); *F16K 5/00* (2013.01); *F16K 31/041* (2013.01)

(56) References Cited

U.S. PATENT DOCUMENTS

| | | | |
|---|---|---|---|
| 1,423,933 A * | 7/1922 | Heatlie | B25B 5/10 |
| | | | 15/220.3 |
| 1,541,065 A * | 6/1925 | Olson | B21F 15/04 |
| | | | 29/757 |
| 1,558,276 A | 10/1925 | Peterson | |
| 1,820,473 A | 8/1931 | Milone | |
| 1,871,857 A * | 8/1932 | Martois | E21B 19/164 |
| | | | 81/57.16 |
| 1,879,099 A * | 9/1932 | Coffey | B25B 27/005 |
| | | | 269/156 |
| 1,890,213 A * | 12/1932 | Cameron | B21F 15/00 |
| | | | 140/119 |
| 1,969,827 A * | 8/1934 | Tautz | B23D 51/14 |
| | | | 279/44 |
| 2,777,347 A * | 1/1957 | Sendoykas | B25B 5/12 |
| | | | 269/228 |
| 2,891,576 A * | 6/1959 | Kennedy | F24F 3/0522 |
| | | | 137/601.04 |
| 2,966,818 A * | 1/1961 | Froeschl | B25B 7/123 |
| | | | 81/368 |
| 3,149,851 A * | 9/1964 | Adams | B66C 1/447 |
| | | | 173/130 |
| 3,224,303 A * | 12/1965 | Giroux | B25B 7/00 |
| | | | 81/343 |
| 3,369,556 A | 2/1968 | Allderdice | |
| 3,436,071 A * | 4/1969 | Petruccelli | B23Q 3/16 |
| | | | 269/20 |
| 3,438,523 A * | 4/1969 | Vik | B66F 9/19 |
| | | | 294/106 |
| 3,541,897 A * | 11/1970 | Horton | E21B 19/164 |
| | | | 81/57.18 |
| 3,554,245 A * | 1/1971 | Eynon | A01G 23/085 |
| | | | 144/3.1 |
| 3,595,505 A * | 7/1971 | Burwell | H01Q 3/04 |
| | | | 248/539 |
| 3,625,503 A * | 12/1971 | Hall | B25B 1/20 |
| | | | 269/142 |
| 3,636,765 A | 1/1972 | Brown | |
| 3,736,018 A * | 5/1973 | Sayre, Jr. | B66C 3/16 |
| | | | 294/106 |
| 3,761,196 A | 9/1973 | Weinert | |
| 3,837,633 A * | 9/1974 | Paulsen | B01L 9/06 |
| | | | 24/517 |
| 3,880,399 A | 4/1975 | Luthe | |
| 3,952,384 A * | 4/1976 | Goldry | B25B 5/147 |
| | | | 254/29 R |
| 3,960,371 A * | 6/1976 | McKenzie | A01G 23/085 |
| | | | 144/24.13 |
| 4,028,689 A | 6/1977 | Schopp | |
| 4,036,051 A | 7/1977 | Fell et al. | |
| 4,066,090 A | 1/1978 | Nakajima et al. | |
| 4,084,453 A * | 4/1978 | Eckel | E21B 19/164 |
| | | | 81/57.18 |
| 4,108,210 A | 8/1978 | Luthe et al. | |
| 4,149,563 A | 4/1979 | Seger | |
| 4,194,419 A * | 3/1980 | Mitchhart | E21B 19/20 |
| | | | 81/57.33 |
| 4,224,825 A | 9/1980 | Feller | |
| 4,245,501 A | 1/1981 | Feller | |
| 4,250,747 A | 2/1981 | Diprose et al. | |
| 4,286,613 A | 9/1981 | Lacoste | |
| 4,333,354 A | 6/1982 | Feller | |
| 4,363,475 A * | 12/1982 | McCarty | B25B 5/006 |
| | | | 269/101 |
| 4,374,479 A * | 2/1983 | Minotti | B25B 13/06 |
| | | | 81/57.3 |
| 4,388,003 A | 6/1983 | Feller | |
| 4,393,919 A | 7/1983 | Anderson | |
| 4,402,239 A * | 9/1983 | Mooney | E21B 19/166 |
| | | | 81/57.16 |
| 4,403,871 A | 9/1983 | Feller | |
| 4,412,647 A | 11/1983 | Lampert | |
| 4,415,279 A | 11/1983 | Beuse et al. | |
| 4,469,118 A | 9/1984 | Walters | |
| 4,473,307 A | 9/1984 | Dobronyi et al. | |
| 4,482,006 A | 11/1984 | Anderson | |
| 4,485,697 A * | 12/1984 | Heilhecker | E21B 19/164 |
| | | | 81/57.2 |
| 4,567,915 A | 2/1986 | Bates et al. | |
| 4,635,668 A | 1/1987 | Netter | |
| 4,650,155 A | 3/1987 | Liantonio | |
| 4,657,038 A | 4/1987 | Lyons | |
| 4,679,592 A | 7/1987 | Lamb | |
| 4,694,390 A | 9/1987 | Lee | |
| 4,723,481 A * | 2/1988 | Hart | F24F 13/15 |
| | | | 251/129.11 |
| 4,738,189 A * | 4/1988 | White | A62C 2/248 |
| | | | 454/369 |
| 4,739,794 A | 4/1988 | Ballun | |
| 4,821,610 A * | 4/1989 | Redmon, Jr. | B25B 7/02 |
| | | | 269/258 |
| 4,848,389 A | 7/1989 | Pirkle | |
| 4,860,993 A | 8/1989 | Goode | |
| 4,909,076 A | 3/1990 | Busch et al. | |
| 5,018,703 A | 5/1991 | Goode | |
| 5,026,197 A * | 6/1991 | Johnson | B29C 45/1775 |
| | | | 403/24 |
| 5,040,438 A * | 8/1991 | Rousseau | E21B 19/163 |
| | | | 81/57.16 |
| 5,060,543 A * | 10/1991 | Warheit | B25B 7/10 |
| | | | 81/321 |
| 5,090,436 A | 2/1992 | Hoch, Jr. et al. | |
| 5,113,892 A | 5/1992 | Hull et al. | |
| 5,167,173 A * | 12/1992 | Pietras | E21B 19/164 |
| | | | 81/57.15 |
| 5,187,916 A * | 2/1993 | Errani | B65B 11/04 |
| | | | 294/116 |
| 5,220,937 A | 6/1993 | Roberts et al. | |
| 5,251,148 A | 10/1993 | Haines et al. | |
| 5,277,087 A * | 1/1994 | Wilson, Jr. | B25B 13/48 |
| | | | 81/57.29 |
| 5,402,822 A | 4/1995 | Brouwer et al. | |
| 5,428,994 A | 7/1995 | Wenzel et al. | |
| 5,522,285 A * | 6/1996 | Wilson, Jr. | B25B 13/48 |
| | | | 81/57.14 |
| 5,544,970 A * | 8/1996 | Studer | F16D 1/0847 |
| | | | 403/235 |
| 5,553,505 A | 9/1996 | Bignell et al. | |
| 5,573,032 A | 11/1996 | Lenz et al. | |
| 5,643,482 A | 7/1997 | Sandelman et al. | |
| 5,671,643 A * | 9/1997 | Henkhaus | B25B 13/461 |
| | | | 81/57.39 |
| 5,692,535 A | 12/1997 | Walters | |
| 5,704,664 A * | 1/1998 | Naumovski | B25B 5/10 |
| | | | 292/288 |
| 5,730,653 A * | 3/1998 | Van Becelaere | A62C 2/14 |
| | | | 454/237 |
| 5,758,684 A | 6/1998 | Hudson et al. | |
| 5,775,369 A | 7/1998 | Hagmann | |
| 5,785,132 A * | 7/1998 | Richardson | E21B 19/161 |
| | | | 175/57 |
| 5,804,768 A | 9/1998 | Sexton | |
| 5,807,141 A | 9/1998 | Sexton | |
| 5,809,623 A * | 9/1998 | Dykstra | B25B 5/04 |
| | | | 24/483 |
| 5,810,662 A * | 9/1998 | Van Becelaere | A62C 2/14 |
| | | | 454/284 |
| 5,899,774 A | 5/1999 | Sexton | |
| 6,012,294 A | 1/2000 | Utsumi | |
| 6,015,142 A * | 1/2000 | Ulicny | F16F 1/10 |
| | | | 267/154 |

(56) References Cited

U.S. PATENT DOCUMENTS

| | | | | |
|---|---|---|---|---|
| 6,039,304 | A | 3/2000 | Carlson et al. | |
| 6,056,008 | A | 5/2000 | Adams et al. | |
| 6,056,282 | A * | 5/2000 | Desmarais | B25B 5/003 269/152 |
| 6,082,225 | A * | 7/2000 | Richardson | E21B 19/164 81/57.16 |
| 6,107,577 | A | 8/2000 | Sexton | |
| 6,125,873 | A | 10/2000 | Brown | |
| 6,155,283 | A | 12/2000 | Hansen et al. | |
| 6,161,764 | A | 12/2000 | Jatnieks | |
| 6,178,996 | B1 | 1/2001 | Suzuki | |
| 6,199,458 | B1 * | 3/2001 | Wrigley | B25B 7/123 81/319 |
| 6,227,080 | B1 * | 5/2001 | Grayo | B25B 7/00 81/368 |
| 6,263,765 | B1 * | 7/2001 | McCamley | B25B 13/04 81/58 |
| 6,315,278 | B1 * | 11/2001 | Gaztanaga | B25B 5/12 269/228 |
| 6,318,199 | B1 * | 11/2001 | Buck | B25B 17/02 74/410 |
| 6,352,106 | B1 | 3/2002 | Hartman | |
| 6,471,182 | B1 | 10/2002 | McIntosh | |
| 6,492,595 | B2 | 12/2002 | Sexton | |
| 6,505,991 | B2 * | 1/2003 | Roman | F16D 1/0847 403/256 |
| 6,534,942 | B2 | 3/2003 | Schmidhuber | |
| 6,612,331 | B2 | 9/2003 | Cederstav et al. | |
| 6,622,930 | B2 | 9/2003 | Laing et al. | |
| 6,626,070 | B2 * | 9/2003 | Peperkorn | B25B 7/123 81/369 |
| 6,648,314 | B1 * | 11/2003 | Degen | B25B 5/085 269/166 |
| 6,663,349 | B1 | 12/2003 | Discenzo et al. | |
| 6,725,167 | B2 | 4/2004 | Grumstrup et al. | |
| 6,725,976 | B2 * | 4/2004 | Oh | F16K 1/223 185/39 |
| 6,752,044 | B2 * | 6/2004 | Hawkins, III | E21B 19/165 81/57.16 |
| 6,774,741 | B2 | 8/2004 | McCurdy et al. | |
| 6,814,096 | B2 | 11/2004 | Vyers et al. | |
| 6,820,631 | B2 | 11/2004 | Lehnst et al. | |
| 6,827,100 | B1 | 12/2004 | Carlson | |
| 6,837,480 | B1 | 1/2005 | Carlson | |
| 6,859,740 | B2 | 2/2005 | Stephenson et al. | |
| 6,889,559 | B2 | 5/2005 | Gimson | |
| 6,954,683 | B2 | 10/2005 | Junk et al. | |
| 7,025,328 | B2 | 4/2006 | Ulicny et al. | |
| 7,096,093 | B1 | 8/2006 | Hansen et al. | |
| 7,104,461 | B2 | 9/2006 | Restivo, Sr. et al. | |
| 7,145,073 | B2 | 12/2006 | Sexton et al. | |
| 7,146,887 | B2 * | 12/2006 | Hunter | B25B 7/123 81/367 |
| 7,152,628 | B2 | 12/2006 | Folk et al. | |
| 7,166,981 | B2 | 1/2007 | Kakutani et al. | |
| 7,178,783 | B2 | 2/2007 | Tuin et al. | |
| 7,191,678 | B2 | 3/2007 | Schnuke et al. | |
| RE39,658 | E | 5/2007 | Carlson et al. | |
| 7,217,884 | B2 | 5/2007 | Sexton et al. | |
| 7,228,869 | B2 | 6/2007 | Wilhelm | |
| 7,231,931 | B2 | 6/2007 | Lull et al. | |
| 7,246,941 | B2 | 7/2007 | Shike | |
| 7,266,427 | B2 | 9/2007 | Hansen et al. | |
| 7,347,125 | B1 * | 3/2008 | Juieng | B25B 7/02 81/129.5 |
| 7,358,437 | B2 | 4/2008 | Sexton et al. | |
| 7,434,477 | B2 | 10/2008 | Lull et al. | |
| 7,451,781 | B2 | 11/2008 | Carlson | |
| 7,472,632 | B2 * | 1/2009 | Engvall | B25B 7/123 81/370 |
| 7,482,535 | B2 | 1/2009 | Sexton et al. | |
| 7,637,723 | B2 | 12/2009 | Sadasivam | |
| 7,691,652 | B2 | 4/2010 | Van Der Wiel | |
| 7,730,810 | B1 * | 6/2010 | Janson | B25B 7/123 81/367 |
| 7,734,572 | B2 | 6/2010 | Wiemeyer et al. | |
| 7,737,359 | B2 | 6/2010 | Sexton et al. | |
| 7,797,080 | B2 | 9/2010 | Durham, III | |
| 7,798,170 | B2 | 9/2010 | Hotz et al. | |
| 7,861,622 | B2 * | 1/2011 | Chervenak | B25B 7/123 81/318 |
| 8,044,298 | B2 | 10/2011 | Sexton et al. | |
| 8,056,451 | B2 * | 11/2011 | Chervenak | B25B 7/10 81/318 |
| 8,109,179 | B2 * | 2/2012 | Richardson | E21B 19/164 81/16 |
| 8,237,051 | B2 | 8/2012 | Sexton et al. | |
| 8,266,990 | B1 * | 9/2012 | Janson | B25B 7/123 81/367 |
| 8,287,207 | B2 * | 10/2012 | Bakken | F16D 13/10 403/261 |
| 8,481,853 | B2 | 7/2013 | Sexton et al. | |
| 8,616,093 | B1 * | 12/2013 | Maniak | E05D 13/1261 160/192 |
| 9,371,624 | B2 * | 6/2016 | Suver | E02D 7/22 |
| 9,737,976 | B2 * | 8/2017 | Christensen | B25B 5/163 |
| 2001/0015283 | A1 | 8/2001 | Sexton | |
| 2001/0030309 | A1 | 10/2001 | Carlson et al. | |
| 2002/0123856 | A1 | 9/2002 | Eryurek | |
| 2003/0080703 | A1 * | 5/2003 | Elliott | B25B 21/002 318/432 |
| 2003/0155776 | A1 * | 8/2003 | Perez-Sanchez | B64C 1/1476 292/24 |
| 2003/0192595 | A1 | 10/2003 | Benson | |
| 2003/0196526 | A1 * | 10/2003 | Wang | B25B 7/02 81/367 |
| 2004/0055429 | A1 * | 3/2004 | Winkler | B25B 7/02 81/367 |
| 2004/0173261 | A1 | 9/2004 | Stoffers | |
| 2005/0039797 | A1 | 2/2005 | Carlson | |
| 2005/0287947 | A1 * | 12/2005 | Ulicny | F24F 13/1426 454/358 |
| 2006/0037646 | A1 | 2/2006 | Wilhelm | |
| 2006/0234414 | A1 | 10/2006 | Van Der Wiel | |
| 2006/0260698 | A1 | 11/2006 | Bailey et al. | |
| 2007/0012367 | A1 | 1/2007 | Hotz et al. | |
| 2007/0131068 | A1 * | 6/2007 | McNatt | B25B 7/10 81/367 |
| 2007/0218828 | A1 * | 9/2007 | Baik | F24F 13/075 454/256 |
| 2008/0048403 | A1 * | 2/2008 | Oldberding | F16K 31/055 279/2.01 |
| 2008/0173838 | A1 | 7/2008 | Schmidig et al. | |
| 2008/0203255 | A1 * | 8/2008 | Workman | B25B 5/003 248/231.61 |
| 2008/0307879 | A1 | 12/2008 | Borst et al. | |
| 2009/0009115 | A1 | 1/2009 | Grogg et al. | |
| 2009/0052982 | A1 * | 2/2009 | Bakken | F16D 13/10 403/261 |
| 2009/0120515 | A1 | 5/2009 | Ohtani et al. | |
| 2009/0145274 | A1 * | 6/2009 | Mikrut | B23D 31/008 83/53 |
| 2009/0171512 | A1 | 7/2009 | Duncan | |
| 2009/0260488 | A1 * | 10/2009 | Kanazawa | B25B 13/48 81/58.2 |
| 2009/0283634 | A1 * | 11/2009 | Tran | B64C 25/26 244/102 A |
| 2009/0314137 | A1 * | 12/2009 | Perez | E21B 19/168 81/57.16 |
| 2010/0015906 | A1 * | 1/2010 | Takahashi | F24F 7/06 454/258 |
| 2010/0018362 | A1 * | 1/2010 | Chervenak | B25B 7/02 81/324 |
| 2010/0107755 | A1 | 5/2010 | Van Der Weil | |
| 2010/0142535 | A1 | 6/2010 | Swainston | |
| 2010/0155635 | A1 | 6/2010 | Fima | |
| 2010/0218648 | A1 * | 9/2010 | Chervenak | B25B 7/123 81/326 |
| 2010/0251742 | A1 | 10/2010 | Tucker et al. | |

(56) References Cited

U.S. PATENT DOCUMENTS

| | | | |
|---|---|---|---|
| 2011/0113935 A1* | 5/2011 | Hall | B25B 7/123 81/367 |
| 2011/0153089 A1 | 6/2011 | Tiemann et al. | |
| 2011/0203421 A1* | 8/2011 | Chervenak | B25B 7/123 81/324 |
| 2012/0096998 A1* | 4/2012 | Shih | B25B 7/123 81/488 |
| 2012/0161562 A1* | 6/2012 | Windgassen | F24F 13/1426 310/83 |
| 2012/0298224 A1 | 11/2012 | Imanari et al. | |
| 2013/0134333 A1* | 5/2013 | Schade | F16K 31/047 251/129.01 |
| 2014/0284861 A1* | 9/2014 | Chen | B25B 5/068 269/216 |
| 2014/0339753 A1* | 11/2014 | Fukui | B25B 5/122 269/228 |
| 2016/0008816 A1* | 1/2016 | Wood | E05F 15/53 241/264 |
| 2016/0067846 A1* | 3/2016 | Christensen | B25B 5/163 269/160 |
| 2017/0072540 A1* | 3/2017 | Takeda | B25B 5/064 |

FOREIGN PATENT DOCUMENTS

| | | |
|---|---|---|
| CN | 1420890 Y | 3/2010 |
| CN | 101696817 A | 4/2010 |
| CN | 202002262 U | 10/2011 |
| CN | 102777982 A | 11/2012 |
| JP | H0658598 A | 3/1994 |
| JP | H06300397 A | 10/1994 |
| JP | 2001271962 A | 10/2001 |
| JP | 2003322395 A | 11/2003 |
| JP | 2004028476 A | 1/2004 |
| WO | WO 99/54987 A1 | 10/1999 |
| WO | WO 2006/088286 A1 | 8/2006 |
| WO | WO 2012/065275 A1 | 5/2012 |
| WO | WO 2012/087659 A2 | 6/2012 |

OTHER PUBLICATIONS

Knowledge is Power—Belimo Energy Valve™; presentation; known prior to Aug. 6, 2012; 45 pages.

U.S. Appl. No. 13/567,818, Burt, filed Aug. 6, 2012.

U.S. Appl. No. 13/645,660, Burt, filed Oct. 5, 2012.

* cited by examiner

FAST ATTACHMENT OPEN END DIRECT MOUNT DAMPER AND VALVE ACTUATOR

FIELD OF THE INVENTION

This invention generally relates to damper and valve assemblies and actuator assemblies therefor.

BACKGROUND OF THE INVENTION

Ventilation and fluid control systems are increasingly used in buildings, including residential, office, commercial, and industrial buildings, sometimes combined with fire or smoke protection equipment for occupant comfort and safety and also for manufacturing processes. Dampers and valves are used to control the volume of flow of air and fluids from no flow to full maximum flow. These damper/valve air and fluid control systems include, but are not limited to, those used in electrical power stations, chemical manufacturing operations, food and beverage processing, liquid gas supply and disposal, water supply and disposal, Heating, Ventilation, and Air Conditioning (HVAC) systems, etc.

The air flow in HVAC and manufacturing process ducts are typically controlled by damper assemblies, or dampers. Dampers are used for the control of airflow to maintain temperatures in air-carrying ducts. Dampers are produced in a variety of sizes, shapes, and styles for installation in rectangular or round ducts. Dampers generally have a connecting rod or shaft, often called a jackshaft, which is connected to the vanes, or blades, of the damper. The damper may have a single blade or multiple interconnected blades that move in unison. Depending on the damper configuration, the jackshaft connecting rod may be connected such that linear movement of the connecting rod causes the damper blades to open or close. In other embodiments, dampers equipped with a shaft, or jackshaft, are arranged such that rotary movement of the jackshaft causes the damper blades to open or close, but an alternate, older technology, approach is to connect a crank arm to the shaft, or jackshaft and use a linear movement to open or shut the damper blades. Round dampers are usually of the butterfly type having a single round disk connected to a rotating shaft.

Control valves throttle the flow of a fluid by having their plugs move in their valve bodies to block the fluid flow at one end of movement and open the flow at the other end of movement. The valve plug may have a variety of shapes, either symmetrical or asymmetrical, and may be connected to a stem and seal that exits the valve body to allow an actuator located outside the valve to position the valve stem and plug. Typically, the seal is designed to have secure contact with the valve body stem and the valve body stem outlet such that it prevents fluid from leaking out of the valve while the valve is operating at its rated static and differential pressure ratings. Some control valves, such as globe and gate valves, require linear stem movement to fully open and close the fluid flow, and other types, such as ball, butterfly, and shoe valves, require rotary movement to fully open and close the fluid flow.

In a typical HVAC or process control application, the damper jackshaft or valve stem is operated by an actuator. The actuator is an assembly that generally includes a motor with some type of coupling apparatus, driven by the motor, which can be attached to the jackshaft or valve stem for the movement thereof.

Embodiments of the present invention represent an advancement over the state of the art with respect to damper and valve actuator assemblies. These and other advantages of the invention, as well as additional inventive features, will be apparent from the description of the invention provided herein.

BRIEF SUMMARY OF THE INVENTION

In one aspect, embodiments of the invention provide an actuator assembly that includes a housing and a clamp disposed within the housing. The clamp is configured to attach the actuator assembly to a damper jackshaft or valve stem. The jackshaft is operable to control the position of one or more damper blades and the valve stem is operable to position the valve plug, ball, gate, globe, shoe, butterfly, etc. The clamp is accessible via a slotted opening which is unobstructed at one end. A motor is configured to rotate the clamping device within the housing. In particular embodiments, a control module is coupled to the motor and configured to control the actuator assembly. In a more particular embodiment, a communications module facilitates communications to and from the actuator assembly over a network, and allows both remote monitoring of the damper or valve and remote control of the actuator assembly. The slotted opening allows for the direct attachment of the actuator assembly to any point along the length of the jackshaft or valve stem. These modules may or may not be enclosed within the actuator assembly.

In a particular embodiment, the clamping device has two opposing members configured to self-center the damper actuator or valve assembly when the two opposing members are tightened around the jackshaft or valve stem. In a more particular embodiment, the two opposing members are curved. In certain embodiments, the position of the two opposing curved members is controlled by rotating a threaded shaft. Portions of the two opposing curved members that engage the jackshaft may have a gripping surface configured to clamp onto cylindrical, square, hexagonal hollow, or hexagonal solid jackshafts of varying sizes and shapes. Also, the gripping surface may include a plurality of ridged projections that engage the jackshaft or valve stem.

In some embodiments, the control module is coupled to a temperature sensor and a temperature setting controller, and wherein the control module operates the actuator assembly controlled based on differences between the actual temperature sensed by the temperature sensor, and on the desired temperature input into the temperature setting controller.

In further embodiments of the invention, the communications module is configured to facilitate communications between the control module and a building management or process control system, and the control module communicates with the building management or process control system over a serial communications bus. A building management system implemented using a communications network is disclosed in U.S. Patent Publication No. 2010/0142535, the teachings and disclosure of which is incorporated herein by reference thereto. In some embodiments, signals from the building management or process control system are retentively stored by the control module so that the actuator assembly can function properly if communication with the building management or process control system is lost. The system may also include a diagnostics module configured to provide diagnostic information on operation of the actuator assembly to a remote location.

In another aspect, embodiments of the invention provide a damper actuator assembly having a damper with at least one damper blade and a jackshaft to control the position of the damper blade. The assembly also includes an actuator attached to a support structure for the damper or valve. The actuator includes a housing having at least one tab with an opening for a fastener, sometimes called an anti-rotation connector or bracket, such that the housing may be removably attached to a support structure of the damper or valve. The fastener could be threaded or riveted. The actuator also has a clamp disposed within the housing. The clamp is configured and configured to attach the actuator assembly to a jackshaft of a damper or stem of the valve. The jackshaft is operable to control the position of the damper blade or blades or the valve stem to position the valve plug. The clamping device is accessible via an open-ended slot. The assembly includes a motor configured to rotate the clamping device within the housing, and a control module coupled to the motor and configured to control the actuator assembly.

The damper may be one of a flap-type damper, a splitter-type damper, a pinch-type damper, a single-blade damper, a butterfly damper, a parallel-blade damper, and an opposed-blade damper. The open-ended slot allows for the direct attachment of the actuator to any point along the length of the jackshaft. In a particular embodiment, the clamping device has two opposing curved members configured to self-center the actuator when the two opposing curved members are tightened around the jackshaft. In certain embodiments, manual rotation of a threaded shaft adjusts a position of the two opposing curved members.

In another aspect, embodiments of the invention provide a valve actuator assembly having a valve with at a valve stem and plug to control the position of the valve plug. In a particular embodiment, the valve has a linear motion plug travel, such as with a globe valve or gate valve. In alternate embodiments, the valve has an angular rotation plug travel, such as with a ball valve, butterfly valve, or shoe valve. Embodiments of the invention are compatible with, but are not limited to, any of the aforementioned damper and valve types.

Linear stem movement valves have hard stops at each end of travel that limit their movement. Rotary stem movement valves may or may not have hard stops at their movement points where they provide minimum and maximum flow. Rotary stem movement valves with hard stops usually have the hard stops aligned at their points of minimum and maximum flow. It is possible to limit a rotary stem valve's maximum flow by locating the stop before the point of maximum flow so that the hard stop restricts the actuator from moving above the desired flow point of travel. This hard stop could also be integrated within the actuator itself either by mechanical or electronic means.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
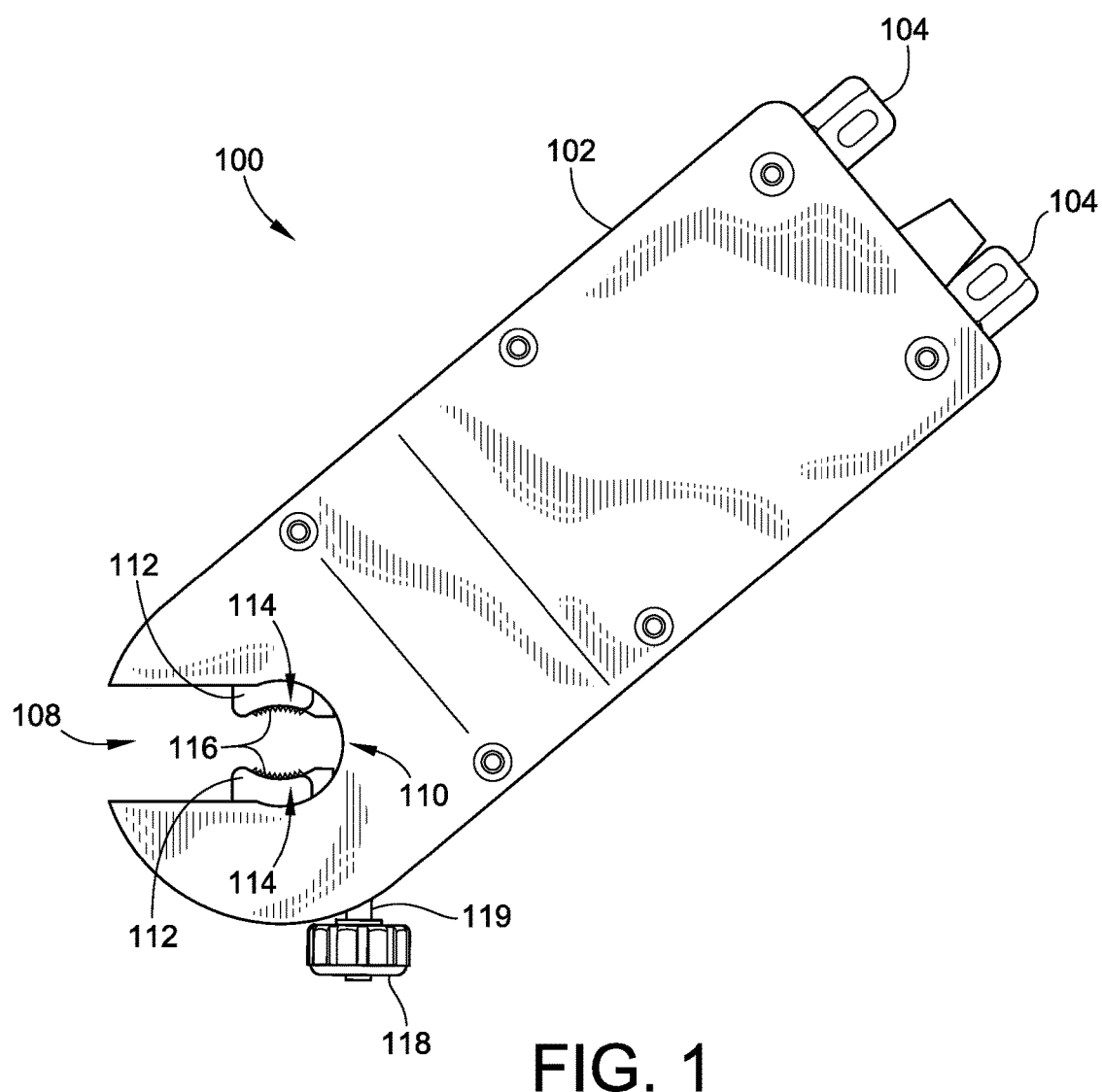
FIG. 1 is a side view of a actuator assembly, according to an embodiment of the invention.

FIG. 1 is a side view of an actuator assembly 100, according to an embodiment of the invention. The actuator assembly 100 has a housing 102 with one or more tabs 104 for attaching the actuator assembly 100 to a support structure for a damper or valve. In the embodiment of FIG. 1, the actuator assembly 100 has two tabs 104 located at one end of housing 102. Each tab 104 has an opening configured to accommodate a fastener (not shown) to secure the actuator assembly 100 in place.

The actuator assembly 100 has an open-ended slot 108, which, as can be seen from FIG. 1, is a slotted opening that is totally unobstructed at one end. In a particular embodiment of the invention, there is a clamp, or clamping device 110, towards a closed end of the open-ended slot 108. The clamping device 110, which includes two opposing curved members 112. In a more particular embodiment, each of the two opposing curved members 112 has a gripping surface 114. In the embodiment of FIG. 1, each gripping surface 114 includes a series of ridged projections 116. These gripping surfaces may or may not include ridged projections. The two opposing members 112 are shaped to facilitate clamping onto a cylindrical, square, hexagonal or other variation of a solid or hollow shaft, jackshaft, or valve stem. Further, the curvature of the two opposing members 112 is such that the clamping device 110 can clamp and hold shafts of varying size and shape. However, in alternate embodiments, these opposed clamping members could be shaped in such a way to engage shafts of different shapes. The two opposing members 112 allow direct connection to a damper assembly's jackshaft in cases where the damper blade is positioned via rotary movement of the jackshaft, but can also be connected to a damper mounting accessory utilizing a crank arm to position the damper blades via linear movement of the crank arm. In certain embodiments, the two opposing members 112 are curved, though other shapes, e.g., V-shape, are contemplated.

In certain embodiment, the two opposing curved members 112 are positioned via a threaded rod 119. Rotation of the threaded rod 119 in one direction causes the two opposing curved members 112 to close, while rotation of the threaded rod 119 in the opposite direction causes the two opposing curved members 112 to open. In the embodiment of FIG. 1, the threaded rod 119 is configured to rotated manually using knob 118. However, in alternate embodiments, the threaded rod 119 may be configured, with a square or hexagonal end for example, so that the two opposing curved members 112 can be positioned using power tools or automated assembly equipment.

Continuous rotation electric motors used for driving loads, such as dampers and valves, typically have gears, pulleys, or chain/sprocket drive components to change the motor's speed, torque, and movement range. Gears are more compact than pulleys, chains, belts, or sprockets, and are frequently used in damper and valve actuators because they provide a compact, less expensive, actuator package that is easier to install in tight areas. Like pulleys, chains, and sprockets, the gears provide mechanical advantage through a gear ratio allowing a small electric motor to drive a higher torque rotary load or a higher force linear load. The final output gear is then meshed with a output mechanism which is mechanically connected to the damper shaft or valve stem.

There are a variety of gear technologies that can be used at the motor's output. Some gears are selected based on the actuator's external shape and orientation of the motor's shaft to the gear drive output mechanism and the actuator's output type which can provide either rotary movement or linear movement. To change the orientation of the motor's shaft to the gear drive output mechanism two adjacent gears must have teeth that mesh such that the gear centers and shafts axes are at 90 degrees. Other means could also be used to convert the motion such as a lead screw/screw arrangement for example.

Some gears such as spur gears are straight cut gears with the edge of each gear tooth being aligned with the axis of rotation, and can be meshed together when they are fitted to parallel shafts with the shafts being in the center of each gear. Helical gears have the same circular shape as spur gears, but have helical cut teeth that are angled to the edge of the gear. Double helical gears or herringbone gears have two sets of helical cut teeth that are created in a letter V shape. Double helical gears cancel out the net axial thrust which acts to put more force on the gears' shafts because each helical gear thrusts in the opposite direction. Meshing of adjacent spur or helical gears with different quantities of teeth acts to increase torque and decrease speed, or increase speed and decrease torque with the number of gears in the series and the number of their teeth relative to the adjacent gears determining the total aggregate change in torque and timing.

The meshing to two different types of adjacent gears can be used to alter the orientation of the motor's shaft or a gear's center to an adjacent gear center by 90 degrees or to convert the movement from rotary to linear or from linear to rotary. Common gears used to convert a gear's center to an adjacent gear center by 90 degrees include bevel gears that can have straight cut spur type gear teeth or beveled teeth. Hypoid, Spiroid, and Zerol gears are similar to spiral bevel gears and provide a 90-degree change in the gear centers, but also provide an offset between the two gear centers. A worm gear which has a long width-to-diameter ratio with a continually cut gear tooth can be used with a spur or helical gear to transform a gear's center to an adjacent gear center by 90 degrees.

Planetary or epicyclic gear trains consist of one or more outer gears, or planet gears, revolving about a central, or sun gear. With the use of three or more planet gears the load distribution is shared between the planet gears which provides more equalized and decreased gear teeth forces at each of the planetary gears and subsequent longer gear life when the gears are used for high torque applications. The center sun gear and surrounding planet gears are arranged in the outer ring gear which has the appropriate number of teeth on its inner diameter, rather than on its outer diameter like conventional spur gears, to accommodate the total number of meshing gear teeth in all the planet gears.

In an embodiment of the invention, the gears are located in the new art's housing 102 at the opposite end of the open-ended slot 108. In certain embodiments, the main drive gears used in the actuator assembly 100 are spur gears. Although aspects of the invention have been described with respect to some preferred embodiments, those skilled in the art will recognize that changes may be made in form and detail without departing from the scope and spirit of the invention. For example, an actuator's gear train can consist of a combination of different gear types and can have a different housing 102 shape. Embodiments of the invention may include, but are not limited to, any of the aforementioned gear types.

The actuator assembly 100 must be secured to the damper jackshaft or valve stem assembly or valve linkage shaft using the clamping device 110 and to a support structure with one or more of the tabs 104 before it can properly position its load with proper torque transfer to prevent the actuator housing 102 from twisting. The actuator load typically consists of a jackshaft 154, 204 shown in FIG. 5 and FIG. 6, damper blade(s) 304 shown if FIG. 7, or the valve stem 452 shown in FIG. 8, a valve plug or valve linkage shaft 243 shown in FIG. 9 and linkage and valve plug, ball, gate, butterfly, etc.

Figure 5:
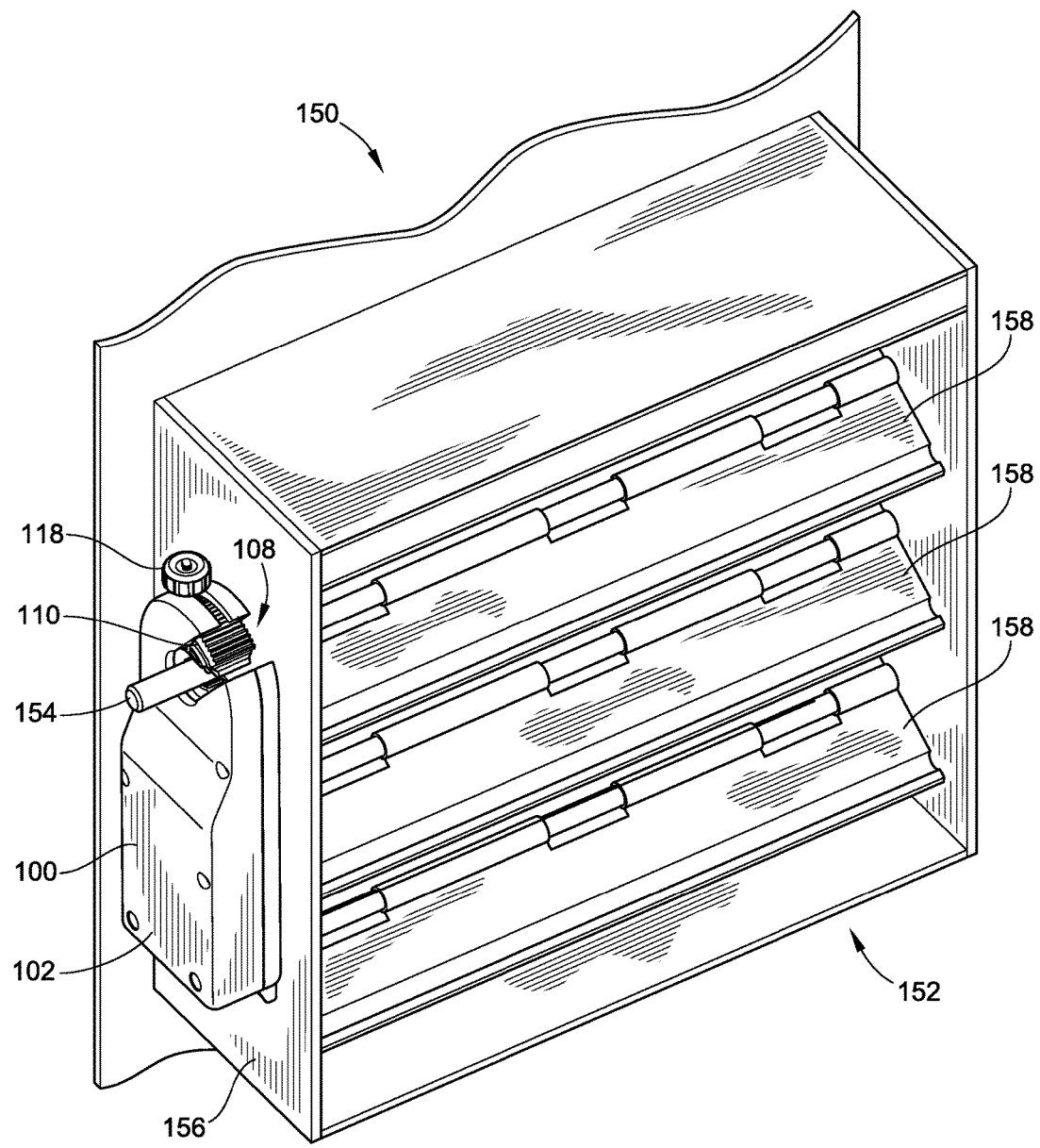
FIG. 5 is a perspective view of a damper and actuator assembly, constructed in accordance with an embodiment of the invention.
Figure 6:
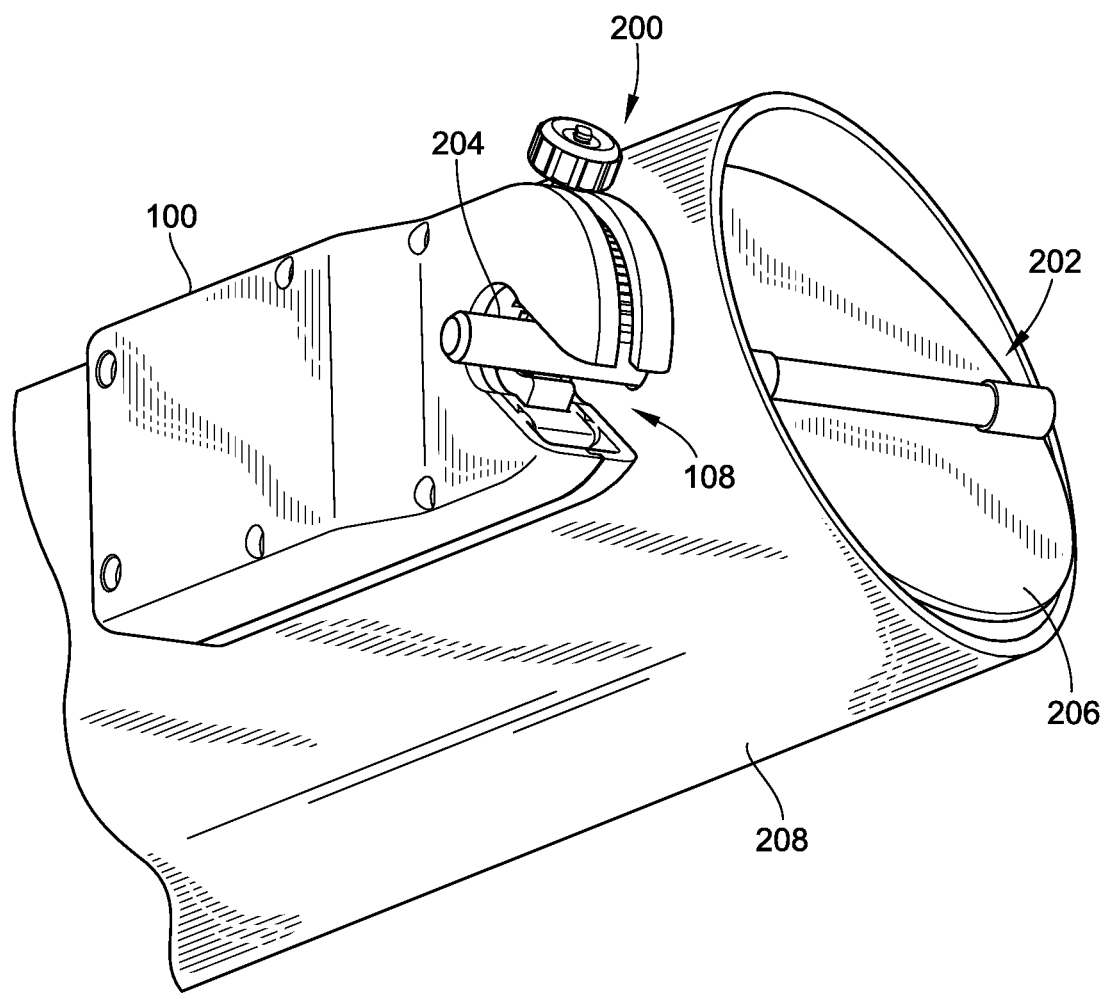
FIG. 6 is a perspective view of a damper and actuator assembly with a damper different from that shown in FIG. 5, constructed in accordance with an embodiment of the invention.

Since the actuator assembly 100 open-ended slot 108 and clamping device 110 can accommodate a range of sizes of shafts there is an open area between the two opposing curved members 112 when the actuator assembly 100 is not installed and in the general area of the open-ended slot 108. It is important to have the damper shaft or valve stem or valve linkage shaft concentrically located in the center of the open-ended slot 108 with the damper jackshaft 154, 204 as shown in FIG. 5 and FIG. 6 or valve stem 452 shown in FIG. 8 or valve linkage shaft 243 shown in FIG. 9 perpendicular to the actuator housing 102 surface. Securing the damper shaft or valve stem concentrically within the open-ended slot 108 and at 90 degrees to the housing 102 surface minimizes the likelihood of having side loads on the actuator that will twist the actuator assembly 100 and create the possibility that the threaded or unthreaded mounting fasteners used with the tabs 104 will become loose from their holes or fatigue and fail.

Figure 2:
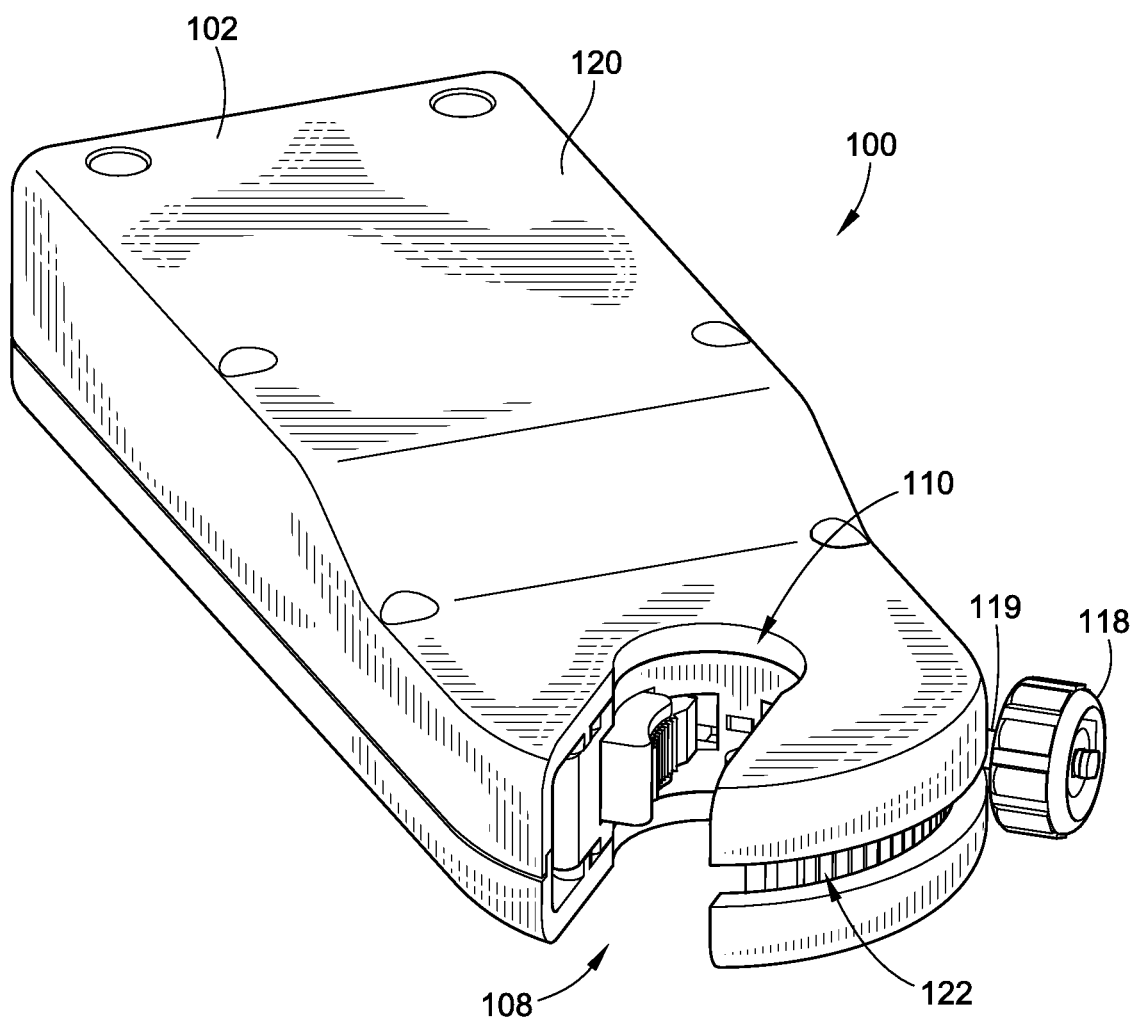
FIG. 2 is a perspective view of the actuator assembly of FIG. 1.

FIG. 2 is a perspective view of the actuator assembly 100 of FIG. 1. It can be seen in the embodiment of FIG. 2, that the housing 102 has a widened portion 120, which houses a motor, typically an electric motor, and a gear train to rotationally drive the clamping device 110. This section may or may not be widened, depending on the gear train and motor used. At one end of the housing 102, there is a slot 122 that accommodates movement of the threaded rod 119 when the clamping device 110 is rotating.

Figure 3:
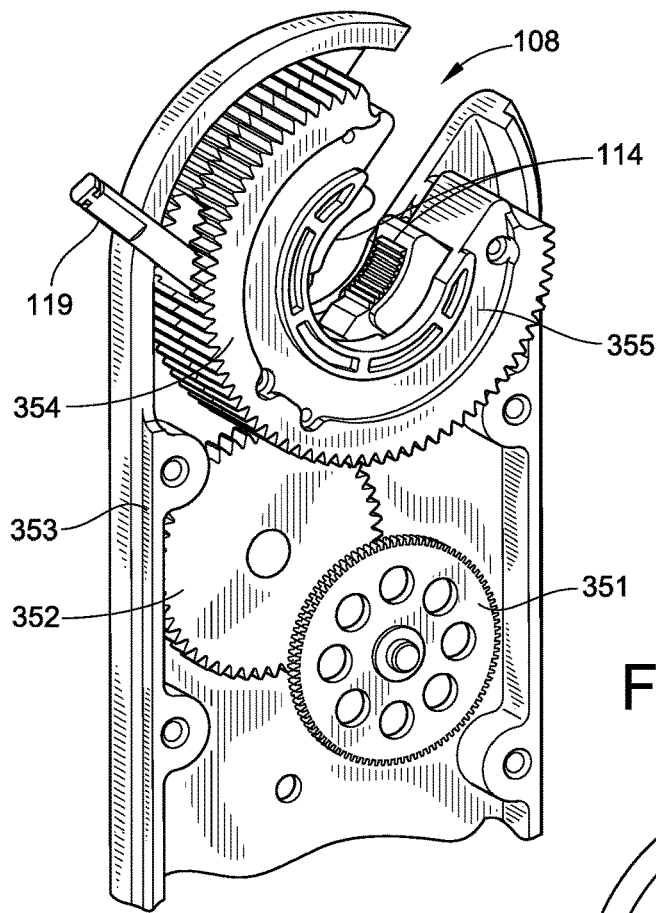
FIG. 3 is a perspective view showing some of the internal components of the actuator assembly at its clamping end, according to an embodiment of the invention.

FIG. 3 is a perspective view showing some, but not all, of the actuator assembly 100 spur gears that provide a mechanical advantage by converting the motor's high speed output to a lower speed, higher torque, ¼ turn or greater output necessary to fully position dampers and valves from open to close. The gear train consists of a number of gears including gear member 351 to obtain the necessary mechanical advantage to position the damper or valve which has a static load and a dynamic load. The damper or valve's static load includes frictions of bearings and seals and their compressions along with the weights of their components relative to their physical orientation along with any movement efficiency losses caused by flexing and bending of load bearing components. Different dampers or valves of the same size may have different static load requirements based on their inherent designs. The damper or valve's dynamic load is determined by the damper blades or valve plugs area relative to the amount of flow resistance that it is opposing.

Gear member 351 is meshed with output gear 352 which is also meshed with the clamping gear 354. The clamping gear 354 is a dual function gear that acts as both a gear and a clamp for the damper jackshaft 154, 204 or the valve stem 452 or valve linkage shaft 243 for cases when the actuator assembly 100 drives a valve linkage that in turn positions a valve. The clamping gear 354 includes a provision for being secured to the damper jackshaft or valve stem or valve linkage shaft by means of the threaded rod 119 that is tightened by the actuator installer. The threaded rod 119 self centers the damper jackshaft or valve stem such that it is concentric within the open-end slot 108, and secures the actuator assembly 100 to the damper jackshaft or valve stem or valve linkage shaft with the clamping device 110 by pulling both of the curved members 112 and gripping surfaces 114 with ridged projections 116 together at an equal rate. This is achieved by means of opposed threads in each of the two gripping surfaces 114 that are positioned in opposite directions by the threaded rod 119.

It is obvious that the clamping gear 354 is not a standard spur gear not only because of its integrated self centering clamping action but also because it is asymmetrical in shape and lacks a center hole that is usually present in spur gears for the gear shaft to center it properly relative to the other gears that it is meshed with. The clamping gear 354 is also unique in that it has two holes through a section of its gear teeth. The first hole allows the threaded rod 119 to enter the gear to operate the two opposing curved members 112 that is attached to the gripping surface 114 containing the ridged projections 116. The second hole on the other side of the clamping gear 354 is to allow the threaded rod 119 to exit the clamping gear 354 when the threaded rod is tightened on a narrow diameter shaft.

Figure 4:
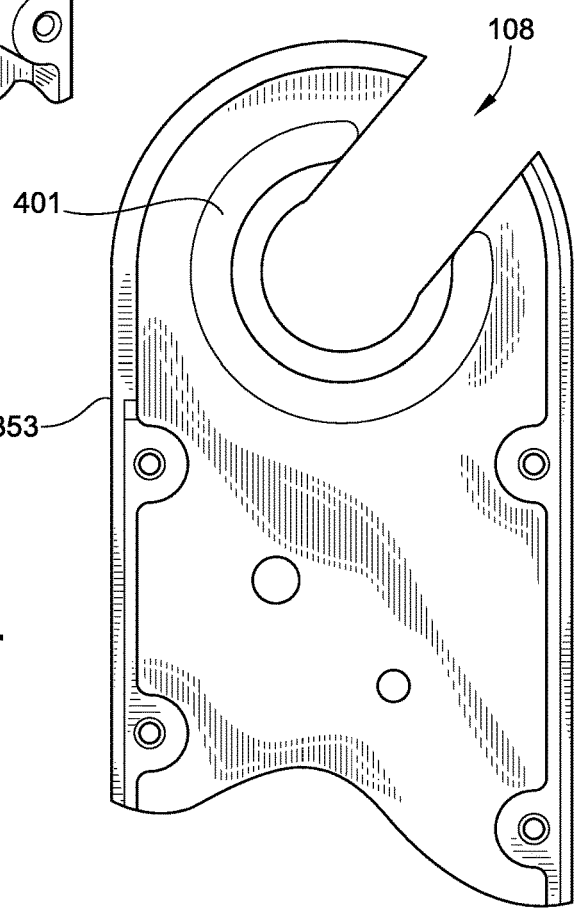
FIG. 4 is a perspective view showing a portion of the actuator assembly housing at its clamping end, according to an embodiment of the invention.

The housing portion 353 shown in FIG. 3 and FIG. 4 contains a convex circular guide 401 that matches the concave circular guide 355 that is present on both sides of the clamping gear 354. Another housing portion (not shown in the illustration) also has a mating convex circular guide that centers the clamping gear 354 as it is meshed and driven by the output gear 352 while simultaneously positioning the connected damper jackshaft 154, 204 or valve stem 452 or valve linkage shaft 243. The circular guide positions the clamping gear 354 so that it maintains the proper gear teeth engagement with the output gear 352.

Actuator assembly 100 can be either individually directly mounted to a damper's jackshaft to position the damper blades or louvers by means of angular rotation. Alternatively, multiple actuator assemblies 100 can be connected to a single jackshaft. In this case, the multiple actuator assemblies 100 have the same type of input signal and the same torque output rating so the multiple actuator assemblies 100 simultaneously contribute torque in unison to position a larger size damper blade(s) or louver(s) by means of angular rotation.

Actuator assembly 100 may be configured to operate as a non-spring-return actuator with no unpowered preset position, or as a spring-return actuator having an unpowered preset position. Non-spring-return actuators remain in their last commanded position upon loss of power. Typically, spring-return actuators utilize a mechanical spring, electrical capacitor, or battery, along with a power loss detection circuit to detect the loss of power and then position the actuator to a preset position until power to the actuator is restored.

Further, the actuator assembly 100 may be configured to be controlled by a variety of input signal types, such as might be received from a remotely located controller, which has discrete inputs to sense a controlled variable. These controlled variables may include temperature, pressure, or humidity, and, in particular embodiments, cause the actuator to provide specific outputs based on the controller's pre-established control algorithm. Common input signals include: binary, or on/off or two position, voltage signals, usually alternating current (AC) signals that drive the actuator fully in one direction during the presence of the voltage, and fully in the other direction in the absence of the voltage.

In certain embodiments, the actuator assembly 100 is controlled via three-wire floating signals, usually, but not always, alternating current, consisting of a signal: 1) to rotate the jackshaft in one direction when the voltage is present on a first input; 2) to rotate the jackshaft in the other direction when the voltage is present on a second input; and 3) to hold the jackshaft in place when the voltage is not present on either the first or second input. The damper actuator assembly 100 can stop and hold at any location in its travel. The third wire is used as the common for the first and second wires.

In a particular embodiment, the actuator assembly 100 is operated by a proportional input signal. That is, the actuator assembly 100 responds in proportion to the level of direct-current (dc) voltage or current, with a pre-established start point and span, where the low-end voltage or current drives the actuator fully in one direction, and where the high-end voltage or current drives the actuator fully in the other direction, and where a voltage or current in between the low-end voltage and high-end voltage will proportionally position the actuator between its two end points based on the reference of the input voltage or current to the pre-established start point and span. Common proportional input signal ranges include 0 to 10 Vdc, 2 to 10 Vdc, and 4 to 20 mA.

A pulse-width-modulated input signal consisting of a pulsed alternating- or direct-current voltage with a pre-established minimum period and maximum period, where the actuator assembly 100 is fully driven in one direction when provided the minimum duration pulse, and fully driven in the other direction when provided the maximum duration pulse, and where a pulse width in between the minimum and maximum period will proportionally position the actuator assembly 100, between the positions of the minimum duration and maximum duration pulses based on the duration of the input pulse in relation to the pre-established minimum and maximum pulse widths.

HVAC and process control valves are available in two way and three way configurations. Two way valves consist of two ports for connection to a pipe with one port being the inlet port that receives the fluid from the pump supply piping system and the other port being the outlet port that sends the fluid out to the other side of the piping system. Three way valves consist of three ports for connection to a piping system. Three way mixing or converging valves have two inlets that receive the fluid usually one port directly from the pump supply piping system and the other port from another location in the system quite often a bypass fluid line and mix them together and send them out a common output port. Three way diverting or diverging valves have one inlet that usually receives the fluid directly from the pump supply piping system and sends it to two different outputs usually a load and a bypass. Pressure dependent valves can be either two-way or three-way while pressure independent valves are two way only.

The closed end of movement for a two way globe, gate, or butterfly valve is more critical than the open end because these valves require a high actuator torque from rotary actuators or force from linear actuators to assure that the valve plug is always securely closed off to shut down the flow. The opposite full open flow position is not as important because the valve's flow is typically non-linear such that when the valve is close to full open it is usually already at or very close to full flow such that any flow gained by forcing the plug hard against a hard stop is negligible. The repercussions of the piping system lacking a small amount of flow at the valve's fully open end is very minor compared to the same valve leaking the same small amount of fluid at the opposite closed end when it should be fully closed.

Rotary actuators typically have a ¼ turn or 90 degree angular rotation or slightly greater to assure that the controlled damper or valve will fully open or close at both ends or in the case of three way valves fully close a valve port at both ends of travel. Typical actuators with proportional or pulse-width-modulated input signals will position the actuator from one end to the other end as the input signal goes from its minimum value to its maximum value. Connecting the actuator to a damper or valve that has less angular rotation movement than ¼ turn or 90 degrees will fully close the damper or valve but will cause the actuator's input signal to be less accurate since the damper or valve will hit its end travel before the input signal reaches its minimum and maximum values.

In certain embodiments, the actuator assembly 100 will stroke its travel directly from its input signal regardless of the available travel available with the damper or valve. It is possible that the damper's or valve's stroke will be different from the actuator's ¼ turn rotary travel output. If the damper or valve's full travel range is less than ¼ turn the actuator will reach both ends of the damper or valve's travel but may hit one end of travel at a signal above the minimum proportional or pulse-width-modulated input signal and hit the other end at a signal below the maximum proportional or pulse-width-modulated input signal. This will allow both ends of the damper or valve to be reached, but will force the actuator assembly 100 to stroke the damper or valve with a smaller than planned proportional band because the end points will be reached with a smaller change of input signal.

In other embodiments, the actuator assembly 100 will stroke the damper or valve over its available travel range even though it may be less than the actuator's full travel range by means of an auto span control program. An auto span actuator control program may initiate a calibration routine the first time the actuator is powered up and installed on the damper or valve or valve linkages either automatically or by means of a manual command to initiate the calibration routine. Typically, the calibration routine strokes the actuator assembly 100 to both of its end points, and determines if it can reach its travel end points or if it cannot reach the end points because it has hit a hard mechanical stop in the damper or valve. If the actuator assembly 100 hits the hard stop of the damper or valve at either end of travel it senses that it can move no farther by an increase in motor current or by the lack of gear movement, and then stops to prevent damage to the actuator or to the damper or valve. The actuator assembly 100 may then determine what the actual actuator rotation is when mounted on the damper or valve. When the actual rotation is less than the actuator's available rotation the actuator assembly 100 will re-span its proportional or pulse-width-modulated input signal such that the minimum input signal will position the actuator at one end of travel and the maximum signal will position the actuator assembly 100 at the opposite end of travel such that the actuator assembly 100 uses its full input signal range for the restricted travel to provide more precise control.

Embodiments of the actuator assembly 100 may be fully automatic such that the actuator can only be repositioned based on their control input signal, or may have a manual override feature that permits a user to manually override the actuator assembly 100 to a particular position irrespective of the control input signal or even if there is no power provided to the actuator assembly 100.

FIG. 5 shows a perspective view of a damper and actuator assembly 150, constructed in accordance with an embodiment of the invention. The damper and actuator assembly 150 includes the actuator assembly 100 of FIG. 1 attached to damper assembly 152. The clamping device 110 of actuator assembly 100 is attached to a jackshaft 154 of damper assembly 152. The actuator assembly 100 motor drives the clamping device 110 in a rotating fashion, which, in turn, rotates the jackshaft 154. Rotation of the jackshaft 154 opens and closes damper blades 158. The housing 102 of actuator assembly 100 is attached to a support structure 156 of the assembly 152, using threaded or unthreaded fasteners for example.

The open-ended slot 108 allows for the actuator assembly 100 to be easily attached to the jackshaft 154 even when access to the jackshaft 154 is restricted, due to the building construction for example. Should an existing damper actuator need to be replaced, because the open-ended slot 108 is totally unobstructed at the open end, it can slide directly onto the jackshaft 154. To replace a damper actuator with a conventional actuator, the conventional actuator typically has to be positioned outside of the jackshaft 154, slid over the end of the jackshaft 154 and down along the jackshaft 154 to the support structure 156 for attachment. In cases where the building construction is such that the damper is encased in a brick or concrete frame, there may not be room to slide an actuator over the end of the jackshaft, which may necessitate cutting off a section of the jackshaft and attaching the replacement damper actuator along with an adapter for attachment to the shortened jackshaft.

When the actuator assembly 100 is used on a valve or valve linkage it is also possible to have two actuators connected to the valve's stem or the valve's linkage shaft if the valve's orifice size and the system's fluid pressures require more force than may be provided with one actuator assembly 100. In such cases, the actuator assemblies 100 are often mounted one above the other on the valve stem or next to each other on a valve linkage shaft. With conventional actuator assemblies, the lower or inner actuator cannot be replaced due to a failure without removing the upper or outer actuator. However, actuator assembly 100 allows removal of the lower or inner actuator and installation of a replacement actuator without having to disrupt the upper or outer actuator.

Furthermore, in situations where it may not be advantageous to attach the actuator assembly 100 to an end of the jackshaft 154, the open-ended slot 108 allows for attachment of the damper actuator assembly 100 at any point, in the middle for example, along the length of the jackshaft 154. To attach the actuator assembly 100, a user can simply position the jackshaft 154 within the open-ended slot 108, tighten the clamping device 110 using knob 118 (if done manually) around the jackshaft 154, and immobilize the housing 102 by attachment to support structure 156 or by some other suitable means of immobilization. The opposing members 112 serves to "self-center" or properly position the damper actuator assembly 100 with respect to the jackshaft 154.

FIG. 6 is a perspective view of a damper and actuator assembly 200 with a damper assembly 202 different from that shown in FIG. 5, constructed in accordance with an embodiment of the invention. Damper assembly 202 has a jackshaft 204 attached to the center of a single, round damper blade 206 set in a round duct 208. The actuator assembly 100 controls the damper position in substantially the same manner as described above in the embodiment of FIG. 5. The open-ended slot 108 can be clamped onto any point along the length of the jackshaft 204 to rotate the jackshaft 204 to adjust the position of the damper blade 206. The housing can be attached to the round duct 208, for example, using the tabs 104 shown in FIG. 1.

Figure 7:
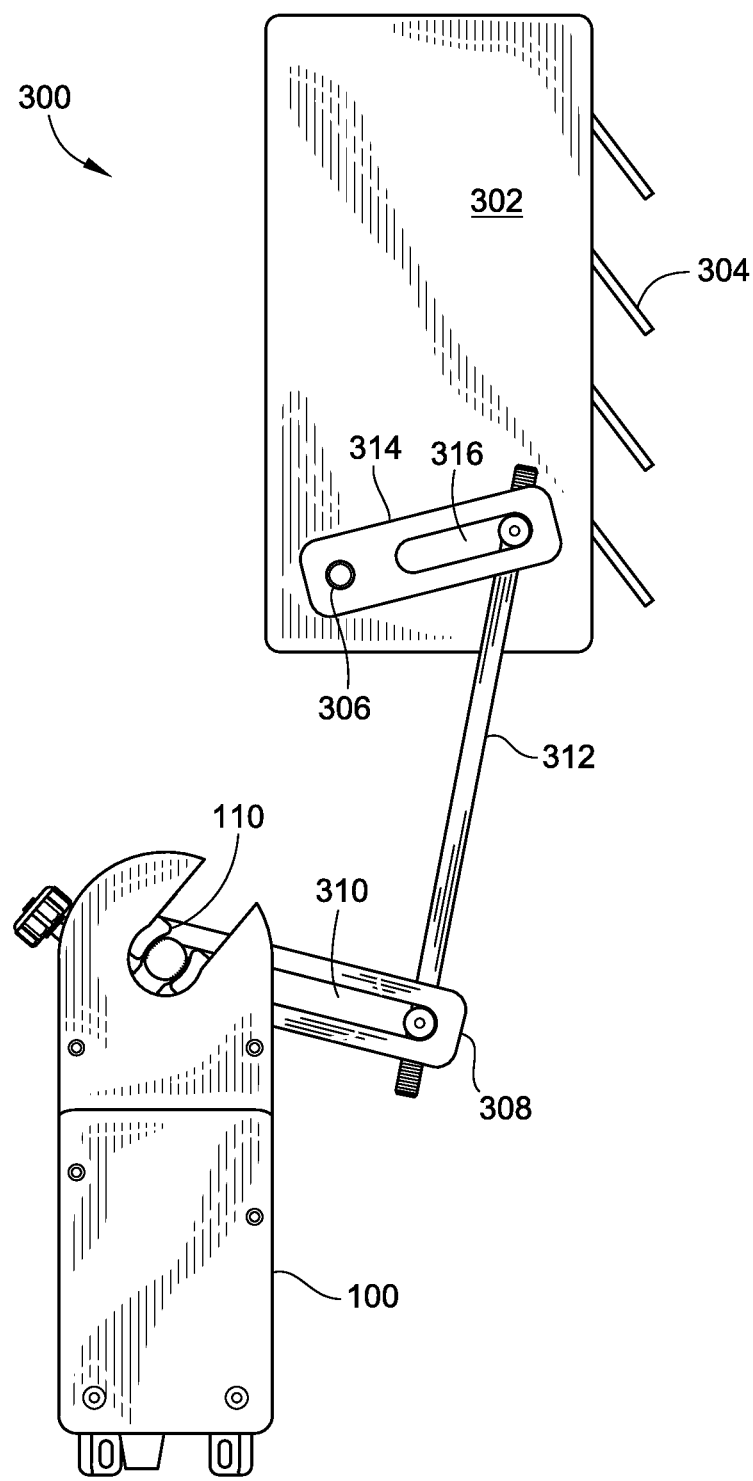
FIG. 7 is a plan view of a damper and actuator assembly using linear linkage movement to position the damper blades, constructed in accordance with an embodiment of the invention.

FIG. 7 is a plan view of a damper and actuator assembly 300 with a damper similar to that shown in FIG. 5, except that damper and actuator assembly 300 has a linear mechanical linkage. FIG. 7 shows the actuator assembly 100 positioning the damper blades 304 of a damper assembly 302 by means of a mechanical linkage consisting of two crank arms 308, 314 and a linear rod 312. Each of the crank arms 308, 314 are connected to the damper rod 312 with ball joint linkage connectors (not shown) to allow unrestricted movement without binding. With this configuration the crank arm 308 secured to the actuator assembly 100 by means of the clamping device 110 converts the actuator assembly 100 rotary movement to linear movement at the damper assembly 302. Crank arm 314 is connected to the damper assembly 302 ¼ turn shaft 306 which is mechanically coupled to the damper blades 304.

Figure 8:
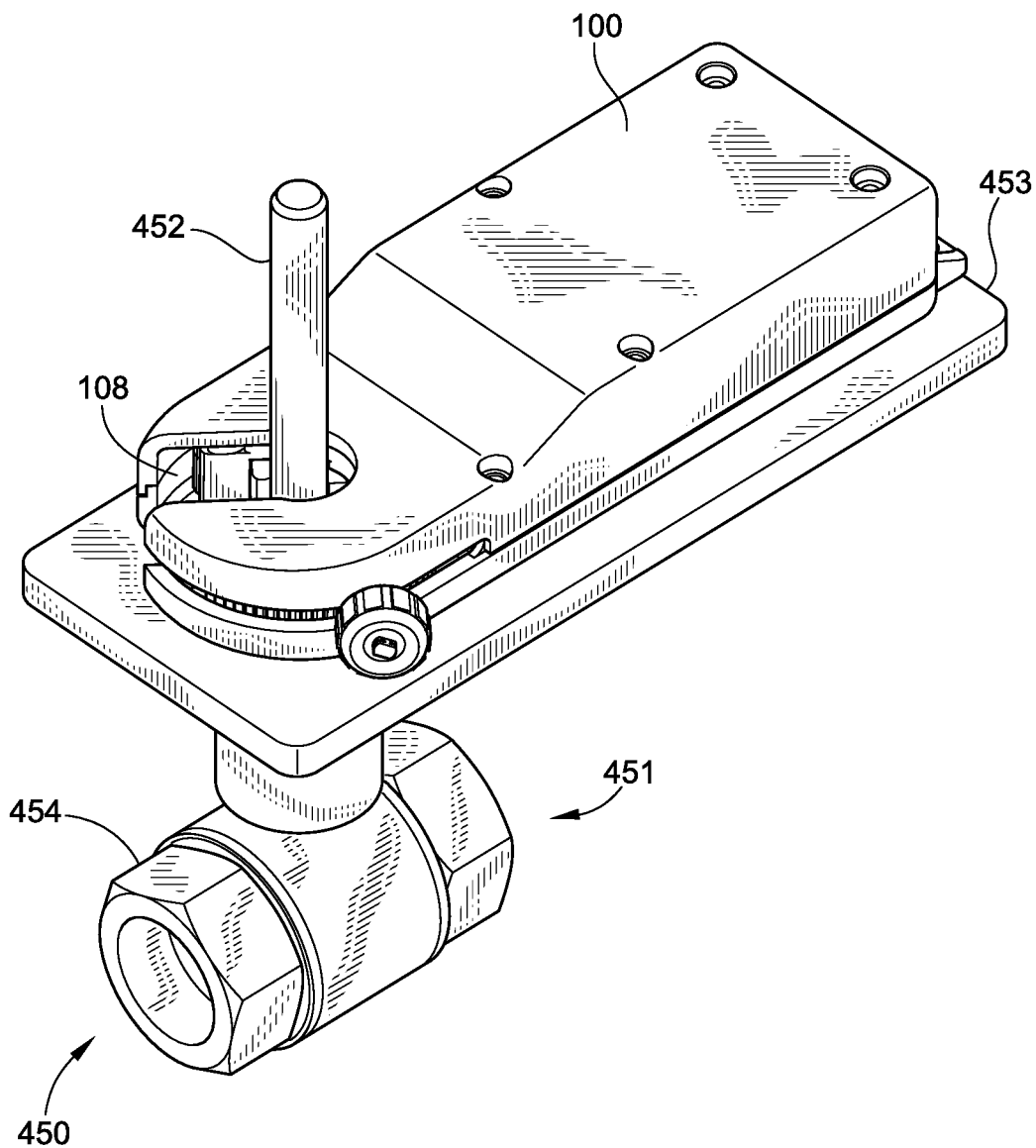
FIG. 8 is a perspective view of a ball valve and actuator assembly, constructed in accordance with an embodiment of the invention.

FIG. 8 shows a perspective view of a ball valve and actuator assembly 450 in accordance with an embodiment of the invention. The ball valve and actuator assembly 450 includes the actuator assembly 100 of FIG. 1 attached to a ball valve 454. The clamping device 110 of the actuator assembly 100 is attached to the valve stem 452 of the ball valve 454. The actuator assembly 100 motor drives the clamping device 110 in a rotating fashion, which, in turn, rotates the valve stem 452. Rotation of the valve stem 452 opens and closes the valve plug 451. The housing 102 of the actuator assembly is attached to a support structure 453 of the ball valve 454, using fasteners for example. This perspective view is also applicable for other rotating plug travel valves including butterfly and shoe valves.

Figure 9:
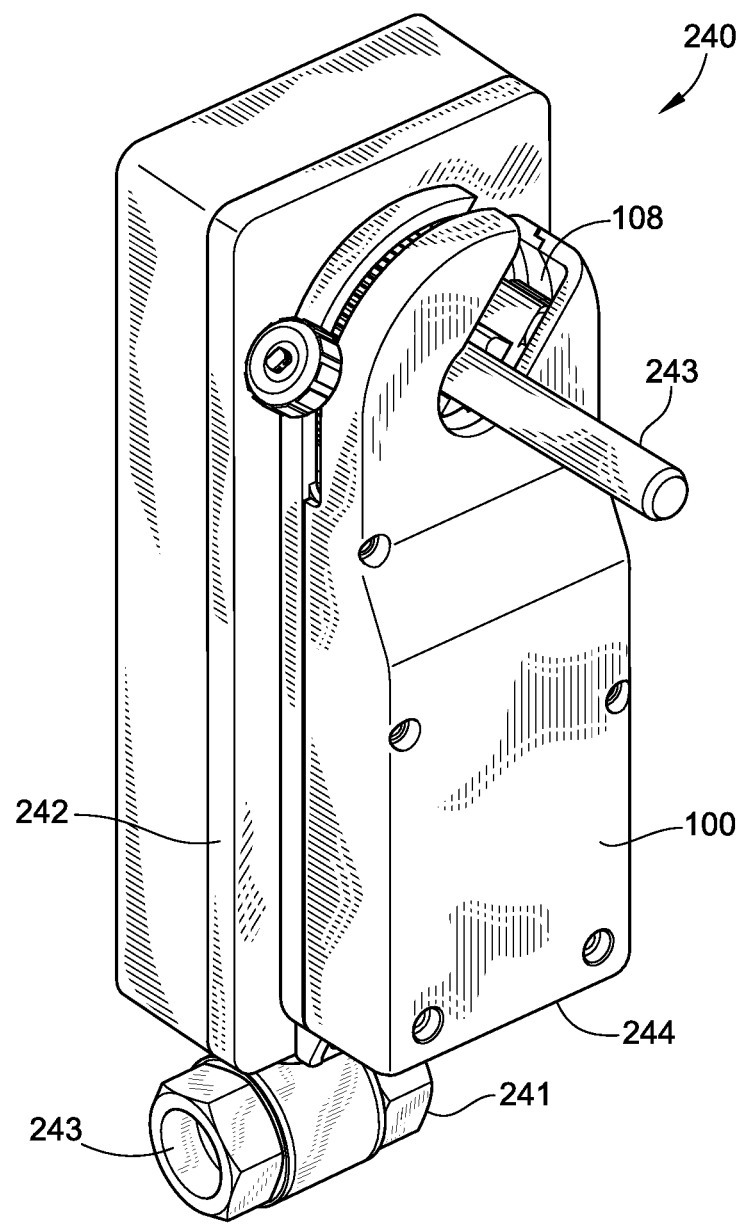
FIG. 9 is a perspective view of a globe valve and actuator assembly, constructed in accordance with an embodiment of the invention.

FIG. 9 shows a perspective view of a globe valve and linkage actuator assembly 240 constructed in accordance with an embodiment of the invention. Globe valve 243 is connected to the rack and pinion valve linkage 242 that converts the actuator assembly 100 rotary travel to the linear travel required by the globe valve 243 stem. The actuator assembly 100 is connected to the valve linkage shaft 243. The housing 102 of the actuator assembly 100 is attached to a support structure 244 of the rack and pinion valve linkage 242, using fasteners for example. Other means of the motion conversion could also be used, such a lead screw/screw mechanism. This perspective view is also applicable for other linear plug travel valves including gate valves.

Figure 10:
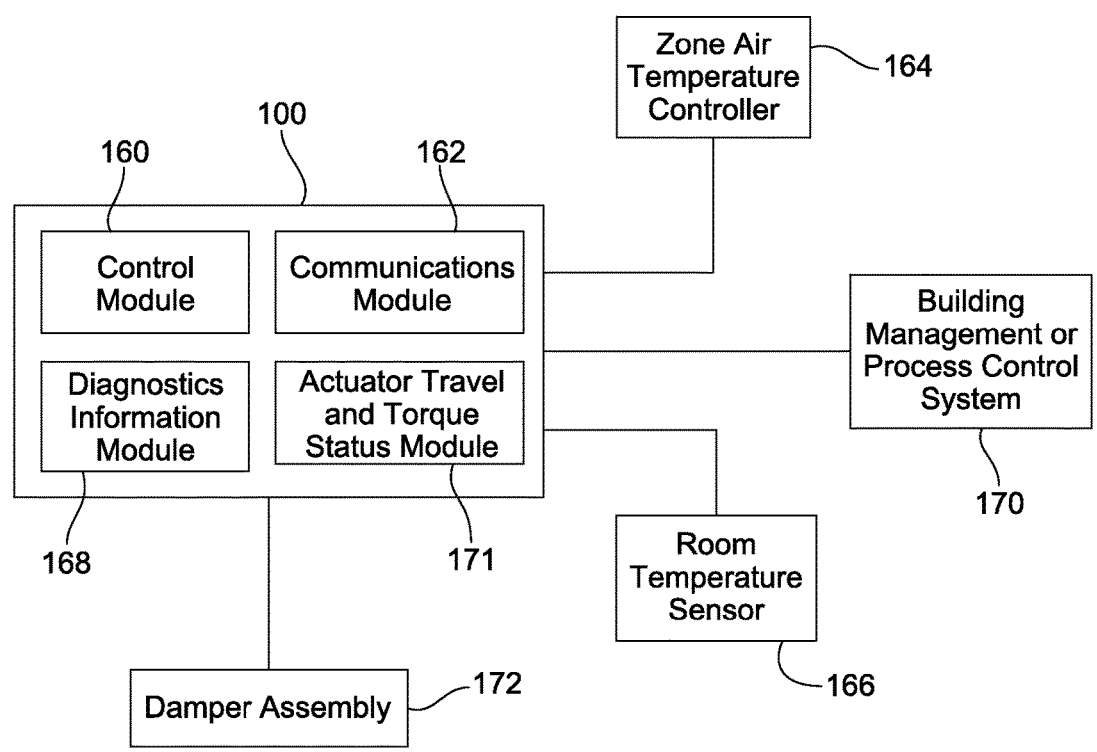
FIG. 10 is a block diagram showing system connections for the damper actuator assembly, in accordance with an embodiment of the invention.

FIG. 10 is a block diagram showing system connections for the actuator assembly 100. A particular embodiment of the actuator assembly 100 includes a control module 160 configured to control operation of the actuator assembly 100. In particular instances, this includes controlling the motor that rotationally drives the clamping device 110. In a further embodiment, the damper actuator assembly 100 includes a communications module 162 configured to facilitate communications to and from the actuator assembly 100 over a network. In this fashion, the communications module 162 permits both remote monitoring and control of the damper and actuator assembly 150, 200, 300 and ball valve and actuator assembly 450 and globe valve and linkage actuator assembly 240.

Referring again to FIGS. 5, 6, 7, 8, and 9, in certain embodiments of the invention, the damper and actuator assemblies 150, 200, 300 the ball valve and actuator assembly 450, and the globe valve and linkage actuator assembly 240 are configured to operate in a stand-alone non-communicating mode with total localized control. In alternate embodiments, the damper and actuator assemblies 150, 200, 300 the ball valve and actuator assembly 450, and the globe valve and linkage actuator assembly 240 include the network communications module 162, and are configured to operate in a communicating network that allows information to be sent and received by the damper and actuator assemblies 150, 200, 300 the ball valve and actuator assembly 450, and the globe valve and linkage actuator assembly 240 in order to synchronize its operation with the building management and process control system and with other HVAC equipment (e.g., heating, cooling, pumping systems) in the building to provide diagnostic and energy data for remote monitoring, alarming, and data retention. In another embodiment of the invention, the damper and actuator assemblies 150, 200, 300 the ball valve and actuator assembly 450, and the globe valve and linkage actuator assembly 240 are used for valve process control in a manufacturing or process.

In at least one embodiment, the communications module 162 receives relevant HVAC temperature and air flow data from the building management or process control system 170 via a serial communication bus. These signals allow the damper and actuator assembly 150 to be synchronized with the building management and process control system 170 and the building's mechanical heating, cooling, and pumping systems in order to increase energy efficiency of the building's HVAC system, as well as provide the above-mentioned diagnostic and energy data. In certain embodiments of the invention, these signals are retentively stored by the control module 160 such that the operation of the damper and actuator assembly 150 can be adapted for the HVAC system in a stand-alone mode or in a communicating network mode. Storage of the signals from the building management and process control system 170 also allow for proper operation in a communicating network mode if, for any reason, communications to the building management and process control system 170 network are lost.

The control module 160 compares the room temperature sensor 166 measured temperature with and desire temperature input by a user into a zone air temperature controller 164, and determines if the blades of damper assembly 152, 202, 302 need to proportionally open or close to maintain the desired room temperature. In an embodiment, the control module 160 mathematically calculates the difference between the measured temperature of the room temperature sensor 166 and the desired temperature of the zone air temperature controller 164, and then provides an empirical position for the actuator assembly 100 using an adjustable proportional band setting. Also available in the zone air temperature controller 164 is an optional integral setting to detect droop or offset, the condition when the temperature is stable but is not at the desired setpoint, and then add a correction factor to eliminate the droop and a derivative setting to anticipate fast changes to the room temperature to improve the HVAC system response, for example, when there are large load changes on the system.

The room temperature sensor 166 may be made from a resistive temperature device (RTD) that is located in the room or space where a desired temperature is being maintained. The resistance of the RTD is measured by connecting it in series with a known reference resistor and applying a current to both resistances. The voltages across the resistances are then measured, and then digitized to represent the sensed temperature.

In another embodiment of the invention, the control module 160 uses an alternative sensor as a substitute for the room temperature sensor 166 along with the zone air temperature controller 164 to sense and control the alternative sensed media. Ventilation and fluid control systems can control air or fluid temperature in a room, piping system, or heat exchanger, air humidity in a room, duct, or process chamber, or static or differential pressure in a room, piping system, duct, heat exchanger, or process chamber. The temperature, humidity, or pressure is controlled by means of the actuator assembly 100 used to position a damper or valve assembly. Alternative sensors may include separately packaged discrete units with electronic circuitry that sense, measure, and provide a 0 to 10 Vdc, a 2 to 10 Vdc, or a 4 to 20 mA proportional signal to the actuator assembly 100 in order to control the media. In yet another embodiment, the damper assembly 172 is instead a valve assembly when the sensed media is controlled by means of a valve.

In particular embodiments, the proportional band acts as the gain of the control loop. A small proportional band provides a higher gain or sensitivity, and a large proportional band provides less sensitive control. As with all the other damper and actuator assemblies 150, 200, 300, the ball valve and actuator assembly 450, and the globe valve and linkage actuator assembly 240 settings, the proportional band, integral and derivative settings may be preset to values that provide stable control for the typical HVAC systems. The integral settings provide negative or positive adjustments factors to correct for differences in the desired and actual temperatures. Also available in the control module 160 are optional derivative settings to anticipate fast changes to the room temperature to improve the HVAC system response when there are large load changes.

In a particular embodiment, the damper actuator assemblies 150, 200, 300, the ball valve and actuator assembly 450, and the globe valve and linkage actuator assembly 240 include a diagnostics information module 168 provides diagnostics information received from the actuator travel and torque status module 171, including a determination as to whether the damper or valve travel has changed due to debris in the damper or valve, from a loose component, a component malfunction. This is detected by a comparison between the actuator's current operating travel range and operating torque and the initial travel range and operating torque that is retentively stored in the actuator. In an embodiment, the diagnostics information module 168 also provides diagnostic detection of an out of range room temperature sensor 166, and an active manual override command to temporarily override the control input signal.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A damper and valve actuator assembly comprising:
    a housing defining an open ended slot;
    a rotatable clamping gear including a clamping device having two opposing members disposed within the open ended slot to attach onto either a damper assembly jackshaft, a valve linkage shaft, or a valve stem, the clamping device being accessible via the open-ended slot; wherein the two opposing members are configured to move toward one another at an equal rate to attach onto either the damper assembly jackshaft, the valve linkage shaft or the valve stem;
    a threaded rod for operating the opposing members of the clamping device toward or away from each other; and
    a motor configured to rotate the clamping device within the housing via a gear train meshed with the clamping gear; and
    wherein the clamping gear is asymmetrical with an open ended shape that coincides with the shape of the open ended slot, and
    wherein the housing further includes a rod slot through which a portion of the rod extends externally through the housing, the clamping gear includes a first hole to receive the rod, and the rod is configured to move along the rod slot when the clamping device is rotated by the motor.

2. The damper and valve actuator assembly of claim 1, wherein the open-ended slot allows for the direct attachment of the clamping device to any point along the length of the jackshaft, or the valve linkage shaft or the valve stem.

3. The damper and valve actuator assembly of claim 1, wherein the clamping device comprises two opposing members configured to self-center the clamping device when the two opposing members are tightened around the jackshaft, or the valve linkage shaft or the valve stem.

4. The damper and valve actuator assembly of claim 3, wherein the two opposing members comprise two opposing curved members.

5. The damper and valve actuator assembly of claim 3, wherein the position of the two opposing members is controlled by rotating a threaded shaft.

6. The damper and valve actuator assembly of claim 3, wherein the two opposing members that engage the jackshaft have a gripping surface configured to clamp onto cylindrical jackshafts or valve stems of varying sizes.

7. The damper and valve actuator assembly of claim 6, wherein the gripping surface comprises a plurality of ridged projections that engage the jackshaft or valve stem.

8. The damper and valve actuator assembly of claim 3, wherein the two opposing members that engage the jackshaft have a gripping surface configured to clamp onto square or hexagonal jackshafts or valve stems of varying sizes and shapes.

9. The damper and valve actuator assembly of claim 1, further comprising a control module coupled to the motor and configured to control the damper actuator assembly.

10. The damper and valve actuator assembly of claim 9, wherein the control module is coupled to a temperature sensor and a temperature setting controller, and wherein the control module operates the damper actuator assembly controlled based on differences between the actual temperature sensed by the temperature sensor, and on the desired temperature input into the temperature setting controller.

11. The damper and valve actuator assembly of claim 1, wherein the damper and valve actuator assembly is configured as a non-spring-return actuator with no unpowered preset position.

12. The damper and valve actuator assembly of claim 1, wherein the damper and valve actuator assembly is configured as a spring-return actuator that returns to a preset position upon loss of power to the damper and valve actuator assembly.

13. The damper and valve actuator assembly of claim 1, wherein the housing is configured to be attached to a support structure for a valve or damper assembly.

14. The damper and valve actuator assembly of claim 1, wherein the clamping gear includes a second hole to allow the rod to exit the clamping gear when the rod is operated to attached the two opposing members onto either a damper assembly jackshaft, a valve linkage shaft, or a valve stem.

15. The damper and valve actuator assembly of claim 1, wherein the two opposing members are configured to move toward one another along an axis to attach onto either the damper assembly jackshaft, the valve linkage shaft or the valve stem.

16. A damper and valve actuator assembly comprising:
a housing;
a rotatable clamping gear including a clamp disposed within the housing, the clamp configured to attach onto one of a damper assembly jackshaft operable to control the position of one or more damper blades, a valve stem or valve linkage shaft each operable to control a valve position, wherein the clamp is accessible via a slotted opening which is unobstructed at one end;
a threaded rod for operating the opposing members of the clamping device toward or away from each other;
a motor configured to rotate the clamping device within the housing via a gear train meshed with the clamping gear; and
a control module coupled to the motor and configured to control the damper and valve actuator assembly,
wherein the clamping gear is asymmetrical with an open ended shape that coincides with the shape of the open ended slot, and
wherein the housing further includes a rod slot through which a portion of the rod extends externally through the housing, the clamping gear includes a first hole to receive the rod, and the rod is configured to move along the rod slot when the clamping device is rotated by the motor.

17. The damper and valve actuator assembly of claim 16, further comprising a communications module to facilitate communications to and from the damper and valve actuator assembly over a network, and configured to allow both remote monitoring and remote control of the damper and valve actuator assembly.

18. The damper and valve actuator assembly of claim 17, wherein the communications module is configured to facilitate communications between the control module and a building management system.

19. The damper and valve actuator assembly of claim 18, wherein the control module communicates with the building management system over a serial communications bus.

20. The damper and valve actuator assembly of claim 19, wherein signals from the building management system are retentively stored by the control module so that the damper and valve actuator assembly can function properly if communication with the building management system is lost.

21. The damper and valve actuator assembly of claim 16, wherein the damper and valve actuator assembly is coupled to a temperature sensor and a temperature setting controller, and wherein the damper and valve actuator assembly is controlled based on the actual temperature sensed by the temperature sensor, and on the desired temperature input into the temperature setting controller.

22. The damper and valve actuator assembly of claim 16, further comprising a diagnostics module configured to provide diagnostic information on operation of the damper and valve actuator assembly to a remote location.

23. The damper and valve actuator assembly of claim 16, wherein the slotted opening allows for the direct attachment of the damper and valve actuator assembly to any point along the length of the jackshaft or valve stem, wherein the clamp comprises two opposing members configured to secure the damper a and valve actuator assembly to jackshafts or valve stems of varying sizes.

24. The damper and valve actuator assembly of claim 16, wherein the clamp is attached to the valve stem of a ball valve, and wherein the motor and control module are configured to control the ball valve.

25. The damper and valve actuator assembly of claim 16, wherein the clamp is attached to the valve stem of one of a butterfly valve, shoe valve, gate valve, globe valve, and wherein the motor and control module are configured to control at least one of the respective valves.

26. The damper and valve actuator assembly of claim 16, wherein the control module is configured to control the motor based on a pulse-width-modulated input signal having a minimum duration and a maximum duration, wherein the minimum duration input signal results in the clamping device being rotated fully in a first direction to a first position, and the maximum duration input signal results in the clamping device being rotated fully in a second direction to a second position, and wherein an input signal whose duration is between the minimum and maximum period results in the clamping device being proportionally positioned between the first and second positions.

27. The damper and valve actuator assembly of claim 16, wherein the control module is configured to control the motor based on an input signal having a DC voltage range or a DC current range, wherein the input signal being at the low end of the range results in the clamping device being rotated fully in a first direction to a first position, and the input signal being at the high end of the range results in the clamping device being rotated fully in a second direction to a second position, and wherein the input signal between the low and high ends results in the clamping device being proportionally positioned between the first and second positions.

28. The damper and valve actuator assembly of claim 16, wherein the control module is configured to control the motor based on a digital input signal having a low level and a high level, such that the low level input signal results in the clamping device being rotated fully in a first direction, and the high level input signal results in the clamping device being rotated fully in a second direction opposite the first direction.

29. The damper and valve actuator assembly of claim 16, wherein the control module has first and second inputs, wherein a voltage on the first input results in the clamping device being rotated in a first direction, and a voltage on the second input results in the clamping device being rotated in a second direction opposite the first direction, and wherein the absence of voltage on both the first and second inputs causes the motor and clamping device to remain in their current positions.

30. The damper and valve actuator assembly of claim 16, wherein the control module is configured to operate either in a fully automatic mode or in a manual override mode in which the user can position the actuator irrespective of loss of power to the damper actuator assembly.

31. A damper and actuator assembly comprising:
a damper having at least one damper blade and a jackshaft to control the position of the damper blade; and a damper actuator attached to a support structure for the damper, the damper actuator comprising:
a housing having at least one tab with an opening for a fastener such that the housing may be removably attached to a support structure of the damper;
a rotatable clamping gear including a clamping device disposed within the housing, the clamping device configured to attach onto the jackshaft of the damper, where rotation of the jackshaft is operable to control the position the damper blade, wherein the clamping device is accessible via an open-ended slot;
a threaded rod for operating the opposing members of the clamping device toward or away from each other;
a motor configured to rotate the clamping device within the housing via a gear train meshed with the clamping gear; and
a control module coupled to the motor and configured to control the damper actuator assembly,
wherein the clamping gear is asymmetrical with an open ended shape that coincides with the shape of the open ended slot, and
wherein the housing further includes a rod slot through which a portion of the rod extends externally through the housing, the clamping gear includes a first hole to receive the rod, and the rod is configured to move along the rod slot when the clamping device is rotated by the motor.

32. The damper and actuator assembly of claim 31, wherein the damper is one of a flap-type damper, a splitter-type damper, a pinch-type damper, a single-blade damper, a butterfly damper, a parallel-blade damper, and an opposed-blade damper.

33. The damper and actuator assembly of claim 31, wherein the open-ended slot allows for the direct attachment of the damper actuator to any point along the length of the jackshaft, the clamping device comprising two opposing members configured to self-center the damper actuator when the two opposing members are tightened around the jackshaft, wherein manual rotation of a threaded shaft adjusts a position of the two opposing curved members.

34. The damper and actuator assembly of claim 31, further comprising a communications module to facilitate communications to and from the damper actuator over a network, and configured to allow both remote monitoring of the damper and remote control of the damper actuator, and wherein the control module is coupled to a temperature sensor and a temperature setting controller, and wherein the control module controls the damper actuator based on differences between the actual temperature sensed by the temperature sensor, and a desired temperature input into the temperature setting controller.

35. The damper and actuator assembly of claim 31, further comprising a diagnostics module configured to provide diagnostic information on operation of the damper actuator to a remote location.

36. The damper and actuator assembly of claim 31, wherein the jackshaft has a plurality of damper actuators attached thereto.

37. The damper and actuator assembly of claim 31, wherein the clamp is further configured to attach to a mounting accessory that utilizes a crank arm to position the damper blades via linear movement of the crank arm.

\* \* \* \* \*